United States Patent

Honda et al.

[11] Patent Number: 5,839,506
[45] Date of Patent: Nov. 24, 1998

[54] AIR CONDITIONER MINIMIZING DIFFERENCES IN RIGHT AND LEFT TEMPERATURES

[75] Inventors: Yuji Honda, Okazaki; Katsuhiko Samukawa, Obu, both of Japan

[73] Assignee: Denso Corporation, Kariya, Japan

[21] Appl. No.: 762,706

[22] Filed: Dec. 9, 1996

[30] Foreign Application Priority Data

Dec. 12, 1995 [JP] Japan .................................. 7-323123

[51] Int. Cl.$^6$ .................................................. F25B 29/00
[52] U.S. Cl. ................................. 165/203; 165/42; 165/43
[58] Field of Search ................................. 165/203, 42, 43

[56] References Cited

U.S. PATENT DOCUMENTS

| | | | |
|---|---|---|---|
| 4,762,169 | 8/1988 | Andersen et al. | 165/203 |
| 4,930,567 | 6/1990 | Akabane et al. | 165/43 |
| 5,582,234 | 12/1996 | Samukawa et al. | 165/43 |
| 5,607,105 | 3/1997 | Samukawa et al. | 165/203 |
| 5,704,544 | 1/1998 | Samukawa et al. | 165/203 |

FOREIGN PATENT DOCUMENTS

A-5-213050  8/1993  Japan .

*Primary Examiner*—John K. Ford
*Attorney, Agent, or Firm*—Harness, Dickey & Pierce, PLC

[57] ABSTRACT

According to the present invention, when target temperatures of air blown out toward a first and a second air conditioning zones are equal, a target opening degree of a second air mixing door is set to an actual opening degree of a first air mixing door. In this way, the second air mixing door is located at a deviated position in the range of −4−+4 (%) from the actual position of the first air mixing door. Thus, a relative positional deviation between the respective air mixing doors becomes 4 (%) even at maximum, which is approximately half as compared with a conventional value. Accordingly, temperatures of air blown out toward the first and second air conditioning zones can be substantially the same, and a comfortable temperature control independently for the right and left seats can be realized.

13 Claims, 5 Drawing Sheets

AIR CONDITIONER MINIMIZING DIFFERENCES IN RIGHT AND LEFT TEMPERATURES

CROSS REFERENCE TO RELATED APPLICATION

This application is based upon and claims priority of Japanese Patent Application No. Hei 7-323123 filed on Dec. 12, 1995, incorporated herein by reference.

BACKGROUND OF THE INVENTION

1. Field of the Invention

The present invention relates to an air conditioner independently controlling temperatures of air blown out toward the first and the second air conditioning zones in a passenger compartment, and especially, is effectively applied to an air conditioner for a vehicle, independently controlling temperatures of air blown into a driver's seat and a passenger seat thereof.

2. Description of Related Art

Conventionally, as disclosed in JP-A-5-213050, there has been widely known an air conditioner which controls independently temperatures of air blown into the driver's seat (the first air conditioning zone) and the passenger's seat thereof (the second air conditioning zone) in a passenger compartment of the vehicle, so-called the right and left temperatures independently control type air conditioner.

More specifically, in a first air passage communicating with the driver's seat and in a second air passage communicating with the passenger's seat thereof, there are respectively provided a heater core, a first and a second bypass passage for bypassing the heater core, and a first and a second air mixing door. The first air mixing door is driven by a first servo motor whereas the second air mixing door is driven by a second servo motor.

A first and a second target temperature of air blown into the respective seats are calculated based on a first and a second set temperature set by a first and a second temperature setting device disposed corresponding to the respective seats, a temperature in the passenger compartment, an outside temperature and a sunlight amount. A first and a second target opening degree of the first and the second air mixing doors are respectively determined according to those target blown air temperatures. Temperatures of the air blown into the respective seats are independently controlled by controlling the first and the second servo motor based on the target opening degrees.

Figure 8:
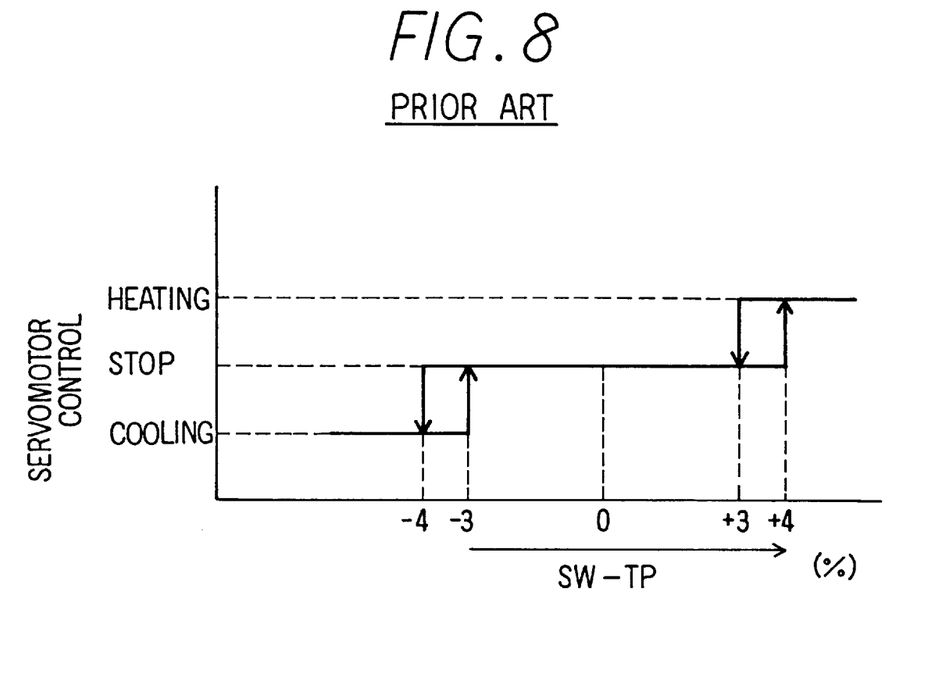
FIG. 8 is a graph showing characteristics of a positional control of an air mixing door in a conventional type.

Besides the above-described conventional air conditioner, as a method for controlling a position of an object to be controlled by a servo motor (in the above case, air mixing doors), a potentiometer is generally disposed for detecting an actual position of the object. In this case, as shown in FIG. 8, if the deviation (SW−TP) between a target position SW of the object and an actual position TP of the object detected by the potentiometer is within a range of a negative predetermined value (for example −4 (%)) to a positive predetermined value (for example +4 (%)), a dead band is provided to stop the doors.

The dead band is provided to control the object stably without causing hunting even if the target position SW slightly varies due to the external disturbance (for example, variation of sunlight) when the object remains stopped.

When the above controlling method, in which a dead band is provided to the servo motor, is applied to the right and left temperature independently control type air conditioner, a problem is caused in that actual temperatures of air blown into the respective seats differ from each other irrespective of the same set temperatures for the driver's seat and the passenger's seat thereof, and thereby passengers feel uncomfortable.

In other words, if the above-described set temperatures are the same for the respective seats, since the temperature in the passenger compartment, the outside temperature and the sunlight amount are the same, the first and the second target air temperatures are the same, and the target opening degrees SW of the respective air mixing doors are the same. However as shown in FIG. 8, the first air mixing door at the side of the driver's seat is located at the maximum opening degree (SW−TP=+4 (%)) in the positive direction in the dead band whereas the second air mixing door at the side of the passenger's seat may be sometimes located at the maximum opening degree (SW−TP=−4 (%)) in the negative direction in the non-sensitive band due to the dead bands in the respective servo motors.

In this case, even if the set temperatures for the both seats are the same, the opening degrees of the respective air mixing doors deviate from each other by 8 (%), the air having different temperatures from each other are blown out toward the driver's seat and the passenger's seat, thereby giving the passengers uncomfortable feeling.

Thus, even if the set temperatures are the same for both seats, it is unavoidable that the opening degrees of the respective air mixing doors deviate relatively as far as the dead bands are disposed in the servo motors, however, an amount of the deviation in the temperatures of air blown toward the respective seats at the same set temperatures should be minimized by making the size of the deviation as small as possible.

SUMMARY OF THE INVENTION

In view of the above problem, an object of the present invention is to provide an air conditioner which satisfies the above-described requirements.

According to a first aspect of the present invention, in an air conditioner, one of target positions of the first temperature adjusting means and the second temperature adjusting means is shifted in a deviated direction where an actual position of the other temperature adjusting means is deviated from the target position of the other temperature adjusting means.

Accordingly, each of the deviation between the target position and actual position in the first and second temperature adjusting means is independently controlled to be within the range from a negative predetermined value to a positive predetermined value. Therefore, even if a slight external disturbance occurs and the target positions vary, the first and second temperature adjusting means can be stably and independently controlled without causing hunting. Thus, temperatures of air blown out toward a first and a second air conditioning zones can be independently controlled with a stable condition.

Under a condition where temperatures of air blown out toward the first and second air conditioning zones are substantially the same, i.e., a condition where the target positions of the first and second temperature adjusting means are the same, if the actual position of the other temperature adjusting means is deviated from the target position in the positive direction, the target position of the one temperature adjusting means is shifted in the positive direction. On the other hand, if the actual position of the other is deviated in the negative direction from the target position, the target position of the one temperature adjusting means is shifted in the negative direction.

Under the condition where the temperatures of air blown out toward the first and second air conditioning zones are the same, an actual position of the other temperature adjusting means may become the above-described predetermined position in the positive direction, and an actual position of the one temperature adjusting means may be the above-described predetermined position in the negative direction. However, since a target position of the one temperature adjusting means is shifted in the positive direction at that time, a relative deviated amount in the respective temperature adjusting means becomes smaller than the range from the negative predetermined value to the positive predetermined value. In other words, a relative deviated amount can be smaller than that in the conventional air conditioner.

According to the present invention, under the condition where temperatures of air blown out toward the first and second air conditioning zones are substantially the same, a relative deviated amount in the first and second temperature adjusting means can be reduced. As a result, a difference in temperatures of air blown out into the first and second air conditioning zones can be reduced.

Furthermore, according to a second aspect of the present invention, under a condition where temperatures of air blown out toward the first and second air conditioning zones are substantially the same, a target position of the one temperature adjusting means may be an actual position of the other temperature adjusting means.

In this way, under the condition where temperatures of air blown out toward the first and second air conditioning zones are substantially the same, no matter where an actual position of the other temperature adjusting means is within the range from the above-described positive predetermined value to the negative predetermined position, an actual position of the one temperature adjusting means remains in the range from the actual position of the other temperature adjusting means to the negative predetermined value or from the actual position of the other temperature adjusting means to the positive predetermined value.

Therefore, a relative deviated amount in the first and second temperature adjusting means is either the size of the negative predetermined value or the positive predetermined value even at maximum, and a relative deviated amount can be smaller than that in the conventional air conditioner.

Thus, in the present invention, a relative deviated amount in the first and second temperature adjusting means as well as a deviated amount in temperatures of air blown out toward the respective zones can be made smaller under a condition where temperatures of air blown out toward the first and second air conditioning zones are substantially the same.

The condition where the temperatures of air blown out toward the first and second air conditioning zones are substantially the same includes not only the condition where the air temperatures are exactly the same but also the condition where the air temperatures are slightly different from each other.

Other objects and features of the invention will appear in the course of the description thereof, which follows.

BRIEF DESCRIPTION OF THE DRAWINGS

Additional objects and advantages of the present invention will be more readily apparent from the following detailed description of a preferred embodiment thereof when taken together with the accompanying drawings in which.

DETAILED DESCRIPTION OF THE PRESENTLY PREFERRED EXEMPLARY EMBODIMENT

A first preferred embodiment in which the present invention is applied to an air conditioner for a vehicle controlling independently the respective temperatures of air blown into to the driver's seat as a first air conditioning zone and the passenger's seat next to the driver's seat as a second air conditioning zone will be hereinafter described with reference to FIGS. 1–7.

An entire construction of an air conditioning unit 1 in this embodiment will be described based on FIG. 1.

Figure 1:
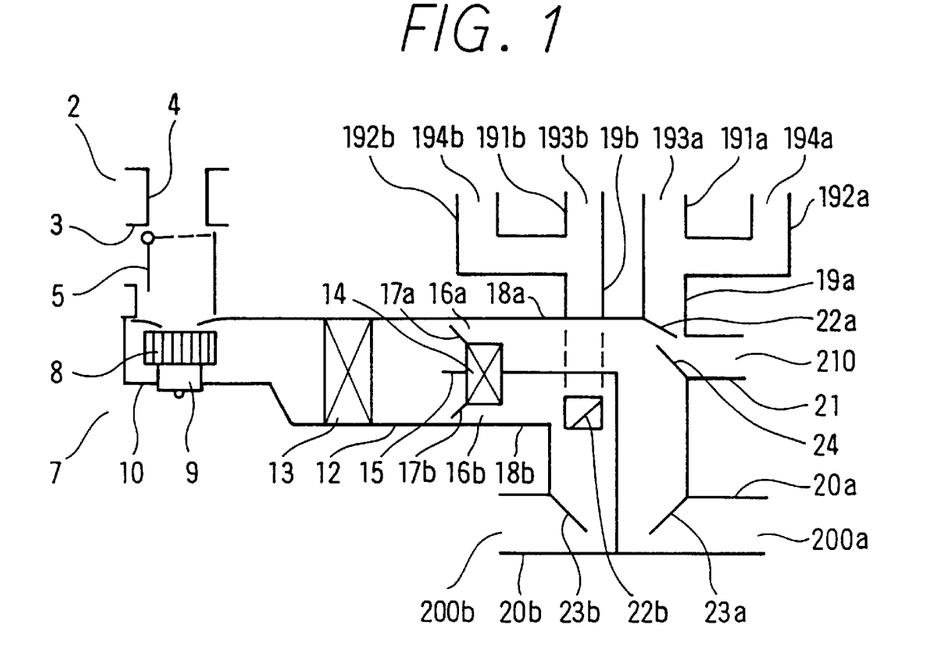
FIG. 1 is a view of an entire structure of an air conditioner unit according to a first embodiment of the present invention.

In FIG. 1, the main body of the air conditioning unit 1 of the air conditioner for a vehicle is disposed below a dashboard in a passenger compartment.

An inside/outside air switching box 2 having an inside air inlet 3 and an outside air inlet 4 is disposed at an upstream air side of the air conditioning unit 1. Furthermore, an inside/outside air switching door 5 for selectively opening or closing the respective air inlets is disposed at a portion where the inside air inlet 3 and the outside air inlet 4 are branched. To the inside/outside air switching door 5, a servo motor 6 (FIG. 2) as driving means is connected.

Figure 2:
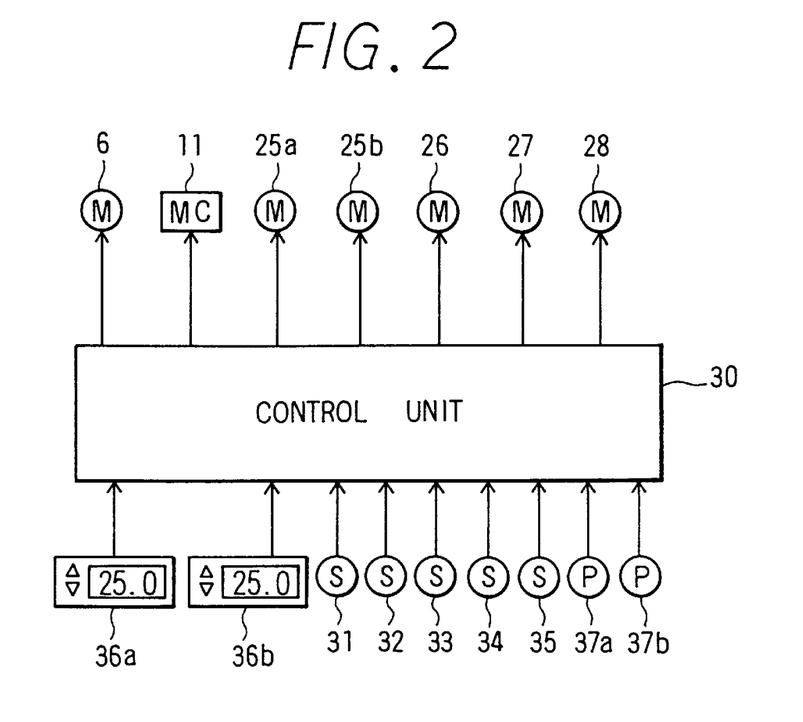
FIG. 2 is a block chart of a control system according to the embodiment.

A centrifugal electric blower 7 as air blowing means is located at the air outlet of the inside/outside air switching box 2. The blower 7 is composed of a centrifugal fan 8, a blower motor 9 for driving the centrifugal fan 8, and a scroll casing 10 containing the centrifugal fan 8. The blower voltage applied to the blower motor 9 is controlled by a blower motor controller 11 (FIG. 2).

A case 12 for the air conditioning unit is connected to an air outlet side of the scroll casing 10. Within the case 12, there are provided an evaporator 13 serving as air cooling means and a heater core 14 (heating means) as air heating means disposed at a downstream air side. A partition plate 15 is disposed at an upstream air side of the heater core 14 inside the case 12. A first and a second bypass passage 16a and 16b are placed at the both sides (top and bottom of FIG. 1) of the heater core 14 in the case 12 so that the air having been cooled by the evaporator 13 may bypass the heater core 14.

A first and a second air mixing door 17a and 17b (first and second temperature adjusting means, and first and second air amount ratio adjusting means) respectively connected to a first and a second servo motor 25a and 25b (first and second air temperature adjusting means shown in FIG. 2) as driving means are disposed at an upstream air side of the heater core 14. In the servo motors 25a and 25b, there are incorporated potentiometers 37a and 37b (shown in FIG. 2) for detecting actual positions of the air mixing doors 17a and 17b by detecting rotational angles of the output shafts of the respective motors.

The ratio between an amount of cool air passing through the heater core 14 above the partition plate 15 in the figure and an amount of cool air passing through the first bypass passage 16a is adjusted by the opening degree of the first air mixing door 17a whereas the ratio between an amount of cool air passing through the heater core below the partition plate 15 in the figure and an amount of cool air passing through the second bypass passage 16b is adjusted by the opening degree of the second air mixing door 17b.

The evaporator 13 is a heat exchanger connected to a compressor, a condenser, a receiver, and a pressure reducer with pipes (these components are not shown), for forming a widely-known refrigerant cycle. The evaporator 13 dehumidifies and cools the air inside the case 12. The above compressor is connected to the engine of the vehicle via an electromagnetic clutch (not shown) and is controlled so as to be driven or stopped by intermittently controlling the electromagnet clutch.

The heater core 14 is a heat exchanger utilizing cooling water of the engine of the vehicle as a heat source and reheats the air cooled by the evaporator 13.

To the air outlet side of the case 12, there are connected a driver's seat side duct 18a (a first air passage) for introducing the conditioned air, temperature of which is adjusted by the opening degree of the first air mixing door 17a, toward the driver's seat in the passenger compartment and a passenger seat side duct 18b (a second air passage) for introducing the conditioned air, temperature of which is adjusted by the opening degree of the second air mixing door 17b, toward the passenger seat next to the driver's seat in the passenger compartment.

There are formed a face duct 19a, a foot duct 20a, and a defroster duct 21 at the downstream end of the driver's seat side duct 18a.

The face duct 19a is branched into a center face duct 191a and a side face duct 192a, and at each end portion of these ducts 191a and 192a, there are formed a center face air outlet 193a and a side face air outlet 194a for blowing the conditioned air toward the upper half of the body of a driver.

At the end portion of the foot duct 10a, there is formed a foot air outlet 200a for blowing out the conditioned air toward the lower half of the body of the driver.

At the end portion of the defroster duct 21, there is formed a defroster air outlet 210 for blowing out the conditioned air toward an inner surface of the windshield.

On the other hand, the face duct 19b and the foot duct 20b are formed at the downstream end of the passenger side duct 18b.

The face duct 19b is branched into the center face duct 191b and the side face duct 192b, and at each end portion of these ducts 191b and 192b, a center face air outlet 193b and a side face air outlet 194b for blowing the conditioned air toward the upper half of the body of the passenger at the passenger seat.

At the end portion of the foot duct 20b, there is formed a foot air outlet 200b for blowing out the conditioned air toward the lower half of the body of the passenger at the passenger seat.

At the air inlet side of the face duct 19a, the foot duct 20a, and the defroster duct 21, there are provided the face door 22a, the foot door 23a, and the defroster door 24 for opening or closing the ducts 19a, 20a and 21, respectively. At the air inlet side of the face duct 19b and the foot duct 20b, there are provided a face door 22b and a foot door 23b for opening or closing the ducts 19b and 20b, respectively.

A servo motor 26 (FIG. 2) is connected to the face door 22a and the foot door 23a whereas a servo motor 27 (FIG. 2) is connected to the defroster door 24. Furthermore, a servo motor 28 (FIG. 2) is connected to the face door 22b and the foot door 23b.

A construction of the control system of the present embodiment will be hereinafter described with reference to FIG. 2.

As shown in FIG. 2, to a control unit 30 for controlling the air conditioning unit, there are electrically connected an inside air temperature sensor 31 for detecting a temperature in the passenger compartment, an outside air temperature sensor 32 for detecting an outside air temperature, a sunlight sensor for detecting sunlight amount entering the passenger compartment, a post-evaporator sensor 34 for detecting an air temperature immediately after passing through the evaporator 13, and a water temperature sensor 35 for detecting a temperature of an engine cooling water in the heater core 14 in addition to the above-described potentiometer 37a and 37b.

Moreover, to the control unit 30, there are electrically connected a driver's seat side temperature setting device 36a for setting a target temperature Tset (Dr) around the driver's seat in the passenger compartment of the vehicle and a passenger seat side temperature setting device 36b for setting a target temperature Tset (Pa) around the passenger seat in the passenger compartment. These temperature setting devices 36a and 36b are placed on the dashboard disposed at the front of the passenger compartment.

The control unit 30 is a known type which includes therein a A/D converter and a microcomputer or the like (these components are not shown). Signals from the respective sensors 31–35 and the potentiometer 37a and 37b are input to the microcomputer after being converted from an alternating current to a direct current by the A/D converter.

The microcomputer is also a known type which includes a CPU, ROM, RAM, I/O or the like (these components are not shown) and is supplied with electric power from a battery (not shown) when the ignition switch of the engine is turned on.

A control process of the above-described microcomputer will be described with reference to a flow chart in FIG. 3.

Figure 3:
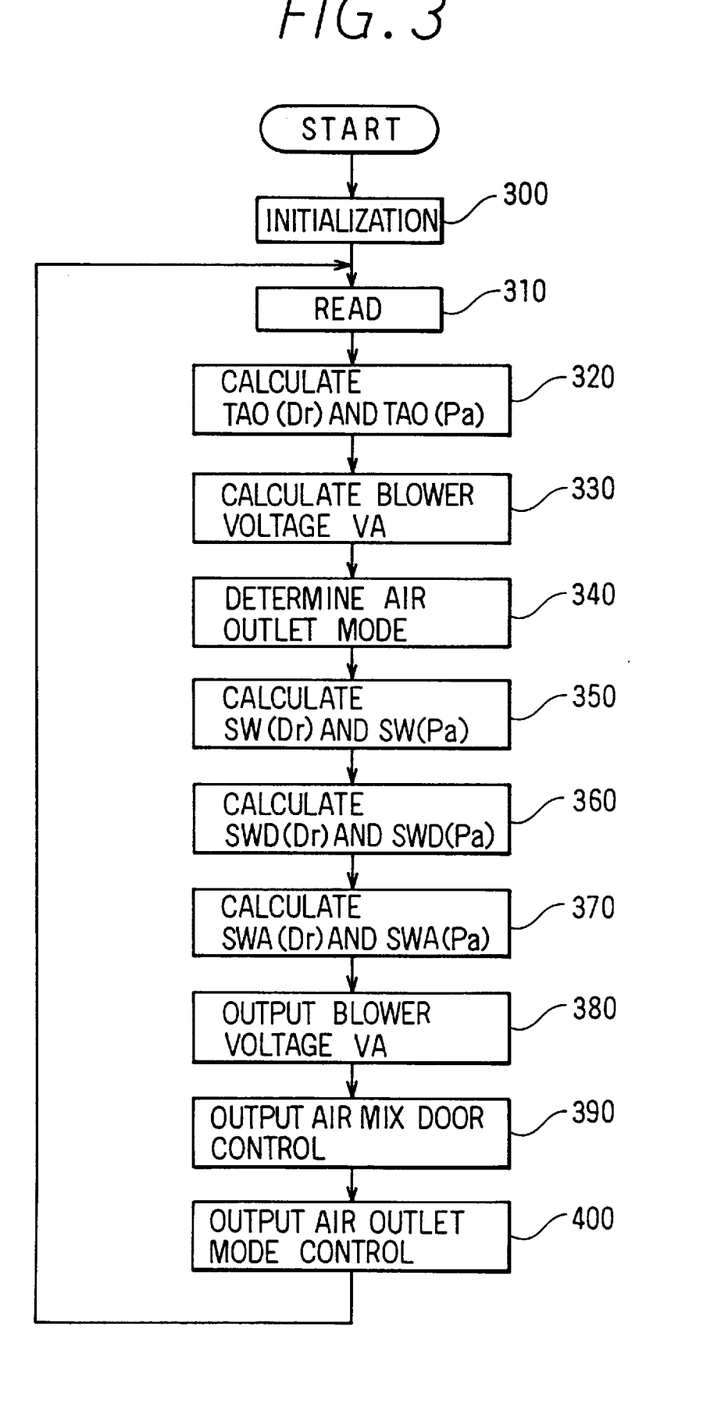
FIG. 3 is a control flow chart by a microcomputer according to the embodiment.

When electricity is supply to the control unit 30 by turning on the ignition switch, a main routine shown in FIG. 3 starts. Then, a memory content of a data processing memory or the like is initialized at the step 300.

At the next step 310, a target set temperature Tset(Dr) set by the driver's seat side temperature setting device 36a, a target set temperature Tset(Pa) set by the passenger seat side temperature setting device 36b, an inside air temperature Tr detected by the inside air temperature sensor 31, an outside air temperature detected by the outside air temperature sensor 32, sunlight amount Ts detected by the sunlight sensor 33, a post-evaporator temperature detected by the post-evaporator sensor 34, a water temperature Tw detected by the water temperature sensor 35, an actual opening degree TP(Dr) of the first air mixing door 17a detected by the potentiometer 37a, and an actual opening degree TP(Pa) of the second air mixing door 17b detected by the potentiometer 37b are read.

At the next step 320, a target air temperature TAO(Dr) for the conditioned air blown toward the driver's seat and a target air temperature TAO(Pa) for the conditioned air blown toward the passenger seat are calculated by substituting Tset (Dr), Tset (Pa), Tr, Tam, and Ts read at the step 310 for the following equations (1) and (2) pre-stored in the ROM.

$$TAO\ (Dr)=Kset \times Tset(Dr)-Kr \times Tr-Kam \times Tam-Ks \times Ts+Kd(Dr) \times (Tset(Dr)-Tset(Pa))+C \qquad (1)$$

$$TAO\ (Pa)=Kset \times Tset(Pa)-Kr \times Tr-Kam \times Tam-Ks \times Ts+Kd(Pa) \times (Tset(Pa)-Tset(Dr))+C \qquad (2)$$

wherein, Kset, Kr, Kam, Ks, Kd(Dr), and Kd(Pa) are gains, and C is a constant for correction.

Figure 4:
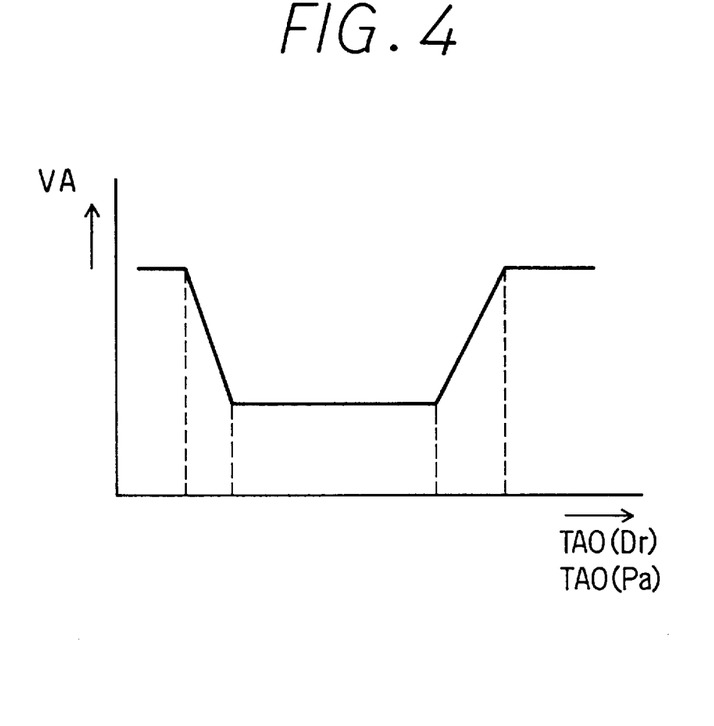
FIG. 4 is a graph showing a relationship between a blower voltage VA and a target air temperature TAO according to the embodiment.

At the next step 330, a blower voltage VA applied to the blower motor 9 is calculated by respectively searching blower voltages VA corresponding to TAO(Dr) and TAO(Pa) from the graph in FIG. 4 pre-stored in the ROM and by averaging these blower voltages.

Figure 5:
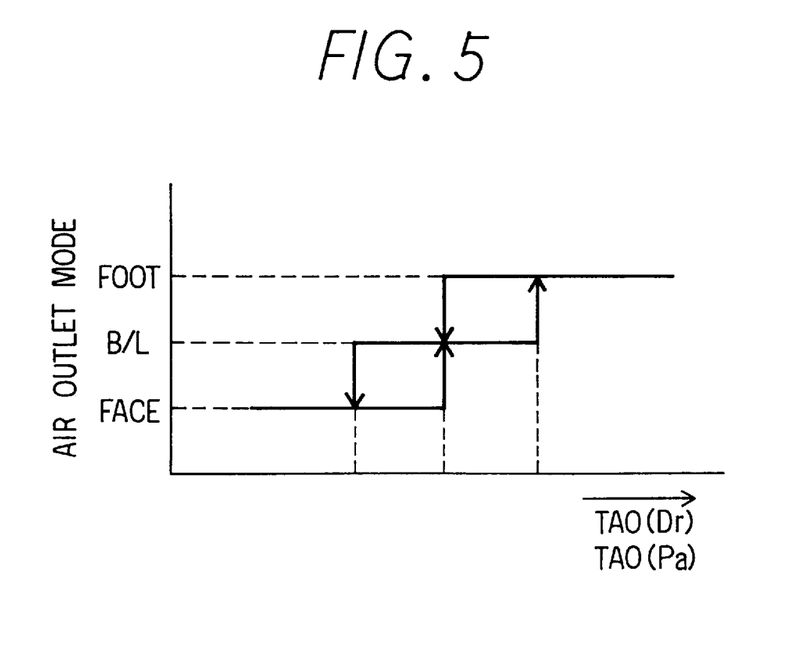
FIG. 5 is a graph showing a relationship between air outlet modes and a target air temperature TAO according to the embodiment.

At the next step 340, an air outlet mode for the driver's seat and an air outlet mode for the passenger seat are determined corresponding to the above-described TAO(Dr) and TAO(Pa) from the graph in FIG. 5 pre-stored in the ROM.

In the face mode, the conditioned air is blown out from the face air outlets 193a, 194a, 193b, and 194b. In the B/L (Bi-level), the conditioned air is blown out from the face air outlets 193a, 194a, 193b, 194b, and from the both of the foot air outlets 200a and 200b. In the foot mode, the conditioned air is blown out from the foot air outlets 200a and 200b.

At the next step 350, a temporary target opening degree SW(Dr) of the first air mixing door 17a and a temporary target opening degree SW(Pa) of the second air mixing door are calculated by substituting Tw, Te, TAO(Dr), and TAO (Pa) read at the step 310 for the following equations (3) and (4) pre-stored in the ROM.

$$SW(Dr)=\{(TAO(Dr)-Te)/(Tw-Te)\} \times 100\ (\%) \qquad (3)$$

$$SW(Pa)=\{(TAO(Pa)-Te)/(Tw-Te)\} \times 100\ (\%) \qquad (4)$$

Figure 6:
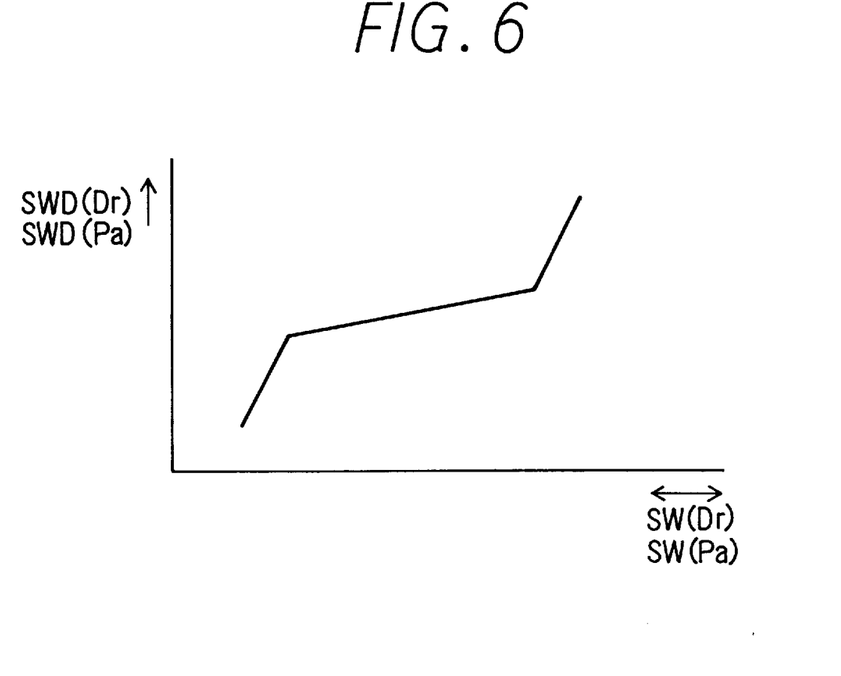
FIG. 6 is a graph to absorb non-linearity of temperature control characteristics according to the embodiment.

At the following step 360, target opening degrees SWD (Dr) and SWD(Pa) corresponding to the above-described SW(Dr) and SW(Pa) are searched and calculated by the graph pre-stored in the ROM. The characteristics for absorbing non-linearity of control characteristics of blown air temperature are shown in FIG. 6.

At the next step 370, a final target opening degree SWA(Dr) of the first air mixing door 17a and a final target opening degree SWA(Pa) of the second air mixing door 17b are calculated by substituting TP(Dr) read in at the step 310, SWD(Dr) and SWD(Pa) calculated at the step 360 for the following equations (5) and (6) pre-stored in the ROM.

$$SWA(Dr)=SWD(Dr)\ (\%) \qquad (5)$$

$$SWA(Pa)=TP(Dr)+SWD(Pa)-SWD(Dr)\ (\%) \qquad (6)$$

At the next step 380, the blower voltage VA calculated at the step 330 is output via the blower motor controller 11.

Figure 7:
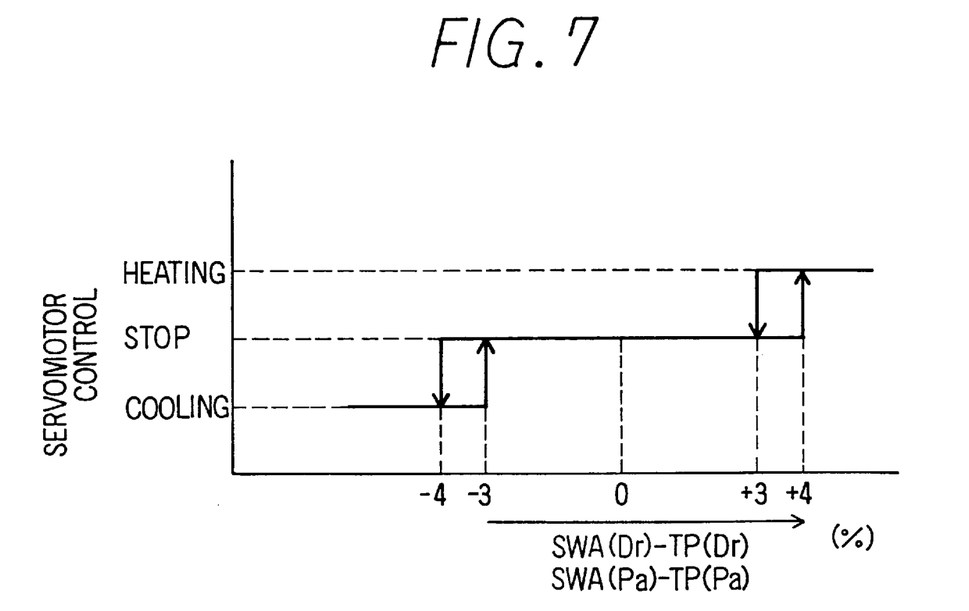
FIG. 7 is a graph showing characteristics of an opening degree control of air mixing doors according to the embodiment.

At the next step 390, the opening degree of the first air mixing door 17a is controlled based on the graph in FIG. 7 pre-stored in the ROM and the deviation (SWA(Dr)−TP (Dr)) between the final target opening degree and an actual opening degree, and an opening degree of the second air mixing door 17b is controlled based on the graph shown in FIG. 7 and the deviation (SWA(Pa)−TP(Pa)) between the final target opening degree and an actual opening degree.

In other words, the dead band is formed in such a manner that the air mixing doors 17a and 17b are controlled not to stop exactly at the final target opening degrees SWA(Dr) and SWA(Pa) but to stop when the deviation is within a range from the negative (−4 (%) in the present embodiment) to the positive (+4 (%) in the present embodiment) predetermined values. By means of the above-described dead, even if the final target opening degree slightly varies due to a slight external disturbance (such as the variation of sunlight) when the air mixing doors 17a and 17b stop, the air mixing doors 17a and 17b are stably controlled without causing hunting.

At the next step 400, the servo motors 26–28 are controlled so that the air outlet modes at the driver's seat side and the passenger seat side are set to the air outlet modes determined at the step 340.

By repeating the above-described process in FIG. 3, the final opening degree SWA(Pa) of the second air mixing door 17b obtained by the equation (6) is calculated as an opening degree obtained by shifting SWD(Pa) obtained by the relationship in FIG. 6 in the deviating direction of the actual opening degree TP(Dr) with respect to the target opening degree SWD(Dr) of the first air mixing door 17a.

When the driver's seat side target temperature Tset(Dr) is equal to the passenger seat side target temperature Tset(Pa), the inside air temperature Tr, the outside air temperature Tam, and the amount Ts are also equal between the respective seats, so that the target air temperatures TAO(Dr) and TAO(Pa) are equal and the target opening degrees SWD(Dr) and SWD(Pa) obtained by the above-described equations (3) and (4) are the same. Accordingly, the final target opening degree SWA(Pa) obtained by the equation (6) is calculated as an actual opening degree TP(Dr) of the first air mixing door 17a.

At that time, no matter where the first air mixing door 17a is located, the second air mixing door is located at a shifted position in a range of −4≅+4 (%) from the actual position of the first air mixing door 17a as shown in FIG. 7, because of the deviation (SWA (Pa)−TP (Pa)) is TP (Dr)−TP (Pa).

According to this embodiment, when the driver's seat side target temperature Tset (Dr) and the passenger seat side target temperature Tset (Pa) are equal and also the target air temperatures TAO (Dr) and TAO (Pa) are equal, a relative deviation between the respective air mixing doors 17a and 17b becomes 4 (%) at maximum. However, in case the opening degrees of the air mixing doors 17a and 17b are controlled by utilizing the graph in FIG. 7 based on a conventional concept where the target opening degrees SWD(Dr) and SWD(Pa) are set to the final target opening degrees SWA(Dr) and SWA(Pa), the above-described relative deviation becomes 8 (%) at maximum. That is, in this embodiment, the relative deviation can be suppressed to the half.

Thus, when the driver's seat side and the passenger seat side target temperatures (Tset (Dr) and Tset (Pa)), and the target air temperatures TAO (Dr) and TAO (Pa) are equal, the temperatures of air blown out toward the respective seats can be substantially the same, so that comfortable independent temperature control can be performed for the both right and left seats.

According to the above-described embodiment, when the target air blow temperatures TAO (Dr) and TAO (Pa) are equal, the final target opening degree SWA (Pa) of the second air mixing door 17b is set to an actual opening degree TP (Dr) of the first air mixing door 17a, however, it may be reversed. That is, the final target opening degree SWA(Dr) of the first air mixing door 17a may be set to an actual opening degree TP(Pa) of the second air mixing door 17b.

According to the above-described embodiment, the positional control of the second air mixing door 17b is performed based on the equation (6) to meet all the possible conditions, however, it may be performed based on the equation (6) only when set temperatures for the respective seats are the same and the target air temperatures TAO (Dr) and TAO (Pa) are substantially the same. In other cases, the positional control of the second air mixing door 17b may be performed based on SWD (Pa) obtained by the relationship in FIG. 6.

Moreover, only when the target air blow temperatures TAO (Dr) and TAO (Pa) are substantially the same, the position of the second air mixing door 17b may be controlled based on the following equation (7). In other cases, positional control may be performed based on SWD (Pa) obtained by the relationship in FIG. 6.

$$SWA\ (Pa) = TP\ (Dr) \tag{7}$$

In case a reheating type where all of the air in the first and the second air passages passes through the heater core 14 and a flow volume or a temperature of warm water passing in the heater core 14 is controlled by a first and a second water valve disposed corresponding to the respective seats is employed, first temperature adjusting means of the present invention may be constructed by the first water valve and driving means thereof whereas second temperature adjusting means may be constructed by the second water valve and driving means thereof.

According to the above-described embodiment, a first air conditioning zone of the present invention is defined as a space around the driver's seat and a second air conditioning zone is around the passenger seat, however, the first air conditioning zone may be around a space at the front seats and the second air conditioning zone may be a space around the rear seats in the passenger compartment.

According to the above-described embodiment, the potentiometer 37a and 37b detect rotational angles of the output shafts of the servo motors 25a and 25b to detect actual positions of the air mixing doors 17a and 17b, however, means for detecting the positions of the air mixing doors 17a and 17b may be directly disposed.

According to the above-described embodiment, the final target opening degrees SWA(Dr) and SWA(Pa) of the air mixing doors 17a and 17b are directly determined, however, target rotational angles of the servo motors 25a and 25b may be determined to thereby determine the above-described SWA(Dr) and SWA(Pa).

According to the above-described embodiment, the dead bands for the servo motors 25a and 25b are provided within the range having 4 (%) in each positive and negative directions of the deviation (SWA (Dr)–TP (Dr) or SWA (Pa)–TP (Pa)) as shown in FIG. 7, however, it may be provided within the range having different regions in the positive and negative directions.

According to the above-described embodiment, the target opening degree SW of the air mixing door 17 is converted to SWD based on the relationship shown in FIG. 6 to absorb non-linearity of control characteristics of blown air temperature as well as to realize the target air temperature TAO, however, if there is no problems about the control characteristics, such a conversion is not necessary.

In the above-described embodiment, when the driver's seat side target temperature Tset(Dr) is equal to the passenger seat side target temperature Tset(Pa), the final target opening degree SWA(Pa) of the second air mixing door 17b is set to an actual opening degree TP(Dr) of the first air mixing door 17a, however, the final target opening degree SWA(Pa) of the second air mixing door 17b may be shifted in a deviated direction where an actual position of the first air mixing door 17a is deviated from the final target opening degree SWA(Dr) to obtain the effect.

Although the present invention has been fully described in connected with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An air conditioner for a vehicle having a passenger compartment, comprising:

a first duct forming a first air passage for introducing air toward a first air conditioning zone in said passenger compartment;

a second duct for forming a second air passage for introducing air toward a second air conditioning zone in said passenger compartment;

first temperature adjusting means for adjusting a temperature of air in said first air passage according to a position thereof;

second temperature adjusting means for adjusting a temperature of air in said second air passage according to a position thereof, independently of said first temperature adjusting means;

temperature controlling means for controlling said first temperature adjusting means so as to set a deviation between target positions and actual positions of said first temperature adjusting means within a range from a negative predetermined value to a positive predetermined value and for controlling said second temperature adjusting means so as to set a deviation between target positions and actual positions of said second temperature adjusting means within a range from a negative predetermined value to a positive predetermined value; and shifting means for shifting one of said target positions of said first and second temperature adjusting means in a deviated direction where an actual position of the other temperature adjusting means is deviated from said target position of the other temperature adjusting means such that a relative deviated amount in the respective temperature adjusting means becomes smaller than the range from the negative predetermined value to the positive predetermined value.

2. An air conditioner according to claim 1, wherein said shifting means shifts one of said target positions of said first and second temperature means in a deviating direction by an amount equal to a deviation from said actual position of the other temperature adjusting means to said target position of the other temperature adjusting means.

3. An air conditioner according to claim 1, further comprising:

heating means disposed in said first and second air passages to heat air in said first and second air passages; wherein, said first air duct includes a first bypass passage for bypassing said heating means, and said second air duct includes a second bypass passage for bypassing said heating means, said first temperature adjusting means includes first air amount ratio adjusting means for adjusting a ratio between air flowing through said heating means and air bypassing said heating means by a rotational position thereof and first driving means for driving said first air amount ratio adjusting means, and said second temperature adjusting means includes second air amount ratio adjusting means for adjusting a ratio between air flowing through said heating means and air bypassing said heating means by a rotational position thereof and second driving means for driving said second air amount ratio adjusting means.

4. An air conditioner according to claim 1, wherein said first air conditioning zone is a space around a driver's seat, and said air conditioning zone is a space around a passenger seat next to said driver's seat.

5. An air conditioner according to claim 1, further comprising:

first temperature setting device for setting a first target temperature of said first air conditioning zone;

second temperature setting device for setting a second target temperature of said second air conditioning zone;

an inside air temperature sensor for detecting a temperature of inside air in said passenger compartment;

an outside air temperature sensor for detecting a temperature of outside air outside said passenger compartment;

a sunlight amount sensor for detecting a sunlight amount entering said passenger compartment;

first target air temperature calculating means for calculating a first target temperature of air blown into said first air conditioning zone based on detected values of said inside air temperature sensor, said outside air temperature sensor and said sunlight amount sensor, said first target temperature corresponding to said target position of said first temperature adjusting means; and second target air temperature calculating means for calculating a second target temperature of air blown into said second air conditioning zone based on detected values of said inside air temperature sensor, said outside air temperature sensor and said sunlight amount sensor, said second target temperature corresponding to said target position of said second temperature adjusting means.

6. An air conditioner according to claim 1, further comprising:

a first potentiometer for detecting an actual position of said first temperature adjusting means; and a second potentiometer for detecting an actual position of said second temperature adjusting means.

7. An air conditioner according to claim 1, wherein said temperature controlling means stops said first temperature adjusting means when a deviation between target positions and actual positions of said first temperature adjusting means is within a range from a negative predetermined value to a positive predetermined value and stops said second temperature adjusting means when a deviation between target positions and actual positions of said second temperature adjusting means is within a range from a negative predetermined value to a positive predetermined value.

8. An air conditioner for a vehicle having a passenger compartment, comprising:

a first duct forming a first air passage for introducing air toward a first air conditioning zone in said passenger compartment;

a second duct for forming a second air passage for introducing air toward a second air conditioning zone in said passenger compartment;

first temperature adjusting means for adjusting a temperature of air in said first air passage according to a position thereof;

second temperature adjusting means for adjusting a temperature of air in said second air passage according to a position thereof, independently of said first temperature adjusting means;

temperature controlling means for controlling said first temperature adjusting means so as to set a deviation between target positions and actual positions of said first temperature adjusting means within a range from a negative predetermined value to a positive predetermined value and for controlling said second temperature adjusting means so as to set a deviation between target positions and actual positions of said second temperature adjusting means within a range from a negative predetermined value to a positive predetermined value; and setting means for setting one of said target positions of said first and second temperature adjusting means to actual positions of the other temperature adjusting means under a condition where temperatures of air blown into said first air conditioning zone and said second air conditioning zone are substantially same.

9. An air conditioner according to claim 8, further comprising:

heating means disposed in said first and second air passages to heat air in said first and second air passages; wherein, said first air duct includes a first bypass passage for bypassing said heating means, and said second air duct includes a second bypass passage for bypassing said heating means, said first temperature adjusting means includes first air amount ratio adjusting means for adjusting a ratio between air flowing through said heating means and air bypassing said heating means by a rotational position thereof and first driving means for driving said first air amount ratio adjusting means, and said second temperature adjusting means includes second air amount ratio adjusting means for adjusting a ratio between air flowing through said heating means and air bypassing said heating means by a rotational position thereof and second driving means for driving said second air amount ratio adjusting means.

10. An air conditioner according to claim 8, wherein said first air conditioning zone is a space around a driver's seat, and said air conditioning zone is a space around a passenger seat next to said driver's seat.

11. An air conditioner according to claim 8, further comprising:

first temperature setting device for setting a first target temperature of said first air conditioning zone;

second temperature setting device for setting a second target temperature of said second air conditioning zone;

an inside air temperature sensor for detecting a temperature of inside air in said passenger compartment;

an outside air temperature sensor for detecting a temperature of outside air outside said passenger compartment;

a sunlight amount sensor for detecting a sunlight amount entering said passenger compartment;

first target air temperature calculating means for calculating a first target temperature of air blown into said first air conditioning zone based on detected values of said inside air temperature sensor, said outside air temperature sensor and said sunlight amount sensor, said first target temperature corresponding to said target position of said first temperature adjusting means; and second target air temperature calculating means for calculating a second target temperature of air blown into said second air conditioning zone based on detected values of said inside air temperature sensor, said outside air temperature sensor and said sunlight amount sensor, said second target temperature corresponding to said target position of said second temperature adjusting means.

12. An air conditioner according to claim 8, further comprising:

a first potentiometer for detecting an actual position of said first temperature adjusting means; and a second potentiometer for detecting an actual position of said second temperature adjusting means.

13. An air conditioner according to claim 8, wherein said temperature controlling means stops said first temperature adjusting means when a deviation between target positions and actual positions of said first temperature adjusting means is within a range from a negative predetermined value to a positive predetermined value and stops said second temperature adjusting means when a deviation between target positions and actual positions of said second temperature adjusting means is within a range from a negative predetermined value to a positive predetermined value.

* * * * *

UNITED STATES PATENT AND TRADEMARK OFFICE
CERTIFICATE OF CORRECTION

PATENT NO. : 5,839,506
DATED : November 24, 1998
INVENTOR(S) : Yuji Honda et al

It is certified that error appears in the above-identified patent and that said Letters Patent is hereby corrected as shown below:

Title Page, [57] Abstract, line 4, delete "zones" & substitute --zone-- therefor Col. 2, line 56, delete "zones" & substitute --zone-- therefor Col. 4, line 62, delete "the"

Col. 7, line 33, delete 1st occurrence of "the"

Col. 8, line 13, after "dead" insert --band--

Col. 8, line 42, "-4 ≅ +4 (%)" should be -- -4 - +4(%) --

Col. 8, line 64, delete "the"

Col. 8, line 67, delete "blow" & substitute --blown-- therefor

Col. 9, line 16, delete "blow" & substitute --blown-- therefor

Col. 11, line 17, claim 4, after "said" insert --second--

Col. 12, line 52, claim 10, after "said" insert --second--

Signed and Sealed this

Fourth Day of May, 1999

Attest:

Q. TODD DICKINSON

Attesting Officer      Acting Commissioner of Patents and Trademarks